US011257008B2

United States Patent
Park et al.

(10) Patent No.: US 11,257,008 B2
(45) Date of Patent: Feb. 22, 2022

(54) METHOD OF SETTING ARTIFICIAL INTELLIGENCE EXECUTION MODEL AND ARTIFICIAL INTELLIGENCE EXECUTION ACCELERATION SYSTEM FOR ARTIFICIAL INTELLIGENCE EXECUTION ACCELERATION

(71) Applicant: Soynet Co., Ltd., Seongnam-si (KR)

(72) Inventors: Jung Woo Park, Anyang-si (KR); Dong Won Eom, Namyangju-si (KR); Yong Ho Kim, Seongnam-si (KR)

(73) Assignee: Soynet Co., Ltd., Seongnam-si (KR)

( * ) Notice: Subject to any disclaimer, the term of this patent is extended or adjusted under 35 U.S.C. 154(b) by 0 days.

(21) Appl. No.: 17/291,753

(22) PCT Filed: Nov. 13, 2018

(86) PCT No.: PCT/KR2018/013795
§ 371 (c)(1),
(2) Date: May 6, 2021

(87) PCT Pub. No.: WO2020/096102
PCT Pub. Date: May 14, 2020

(65) Prior Publication Data
US 2021/0365840 A1 Nov. 25, 2021

(30) Foreign Application Priority Data
Nov. 8, 2018 (KR) .................. 10-2018-0136437

(51) Int. Cl.
*G06N 20/10* (2019.01)
*G06F 9/445* (2018.01)

(52) U.S. Cl.
CPC ......... *G06N 20/10* (2019.01); *G06F 9/44505* (2013.01)

(58) Field of Classification Search
CPC combination set(s) only.
See application file for complete search history.

(56) References Cited

U.S. PATENT DOCUMENTS

2018/0032915 A1 2/2018 Nagaraju et al.
2018/0150684 A1 5/2018 Wang et al.

FOREIGN PATENT DOCUMENTS

KR 10-2016-7035262 A 2/2017
KR 10-1715118 B1 3/2017
(Continued)

OTHER PUBLICATIONS

Gray et al. "Developing Deep Neural Betworks with NVIDIA TensorRT", 2017, pp. 7, https://developer.nvidia.com/blog/deploying-deep-learning-nvidia-tensorrt/.*
(Continued)

*Primary Examiner* — Li Wu Chang
(74) *Attorney, Agent, or Firm* — Bret E. Field; Bozicevic, Field & Francis LLP

(57) ABSTRACT

An artificial intelligence execution acceleration system and a method of setting an artificial intelligence execution model are provided. The system includes: an execution weight extraction module for analyzing a learning model that includes an artificial intelligence model and a weight file generated as a result of artificial intelligence learning, and calculating a data weight of the learning model of artificial intelligence for artificial intelligence execution acceleration; an artificial intelligence accelerated execution file setting module for loading the learning model from an artificial intelligence learning server that calculates the learning model, converting the loaded learning model into a custom layer usable in the artificial intelligence execution acceleration system, and then optimizing the custom layer to calculate an execution model; and an artificial intelligence execution acceleration module for receiving the execution model, configuring an execution environment corresponding to the execution model, and accelerating execution speed of artificial intelligence.

4 Claims, 13 Drawing Sheets

(56) References Cited

FOREIGN PATENT DOCUMENTS

| KR | 10-2017-0055772 B1 | 11/2017 |
| KR | 10-2018-0048407 A | 5/2018 |
| KR | 10-2018-0049786 A | 5/2018 |

OTHER PUBLICATIONS

Sheng et al. "EasyConvPooling: Random Pooling with Easy Convolution for Accelerating Training and Testing", Jun. 2018, pp. 9, https://arxiv.org/pdf/1806.01729.pdf.*

Kollara et al., Deep Learning Diaries: Building Custom Layers in Keras, Internet Post, Nov. 1, 2017, [Retrived on Jul. 11, 2019], Retrieved from <URL: https://www.sama.com/blog/deep-leanring-diaries-building-custom-layers-in-keras></https:>.

First Office Action for Korean Application No. 10-2018-0136437 dated Apr. 22, 2020, with its English translation, 19 pages.

Second Office Action for Korean Application No. 10-2018-0136437 dated Jul. 1, 2020, with its English translation, 8 pages.

Decision to Grant a Patent for Korean Application No. 10-2018-0136437 dated Sep. 2, 2020, with its English translation, 2 pages.

Gray et al., Deploying Deep Neural Networks with NVIDIA TensorRT, nVIDIA, Apr. 2, 2017, 12 pages.

Prasana et al., TensorRT 3: Faster TensorFlow Inference and Volta Support., nVIDIA, Dec. 4, 2017, 16 pages.

TensorRT User Guide—nVIDIA. DU-08540-021_v01. Jul. 2017, 31 pages.

\* cited by examiner

[Fig. 1]
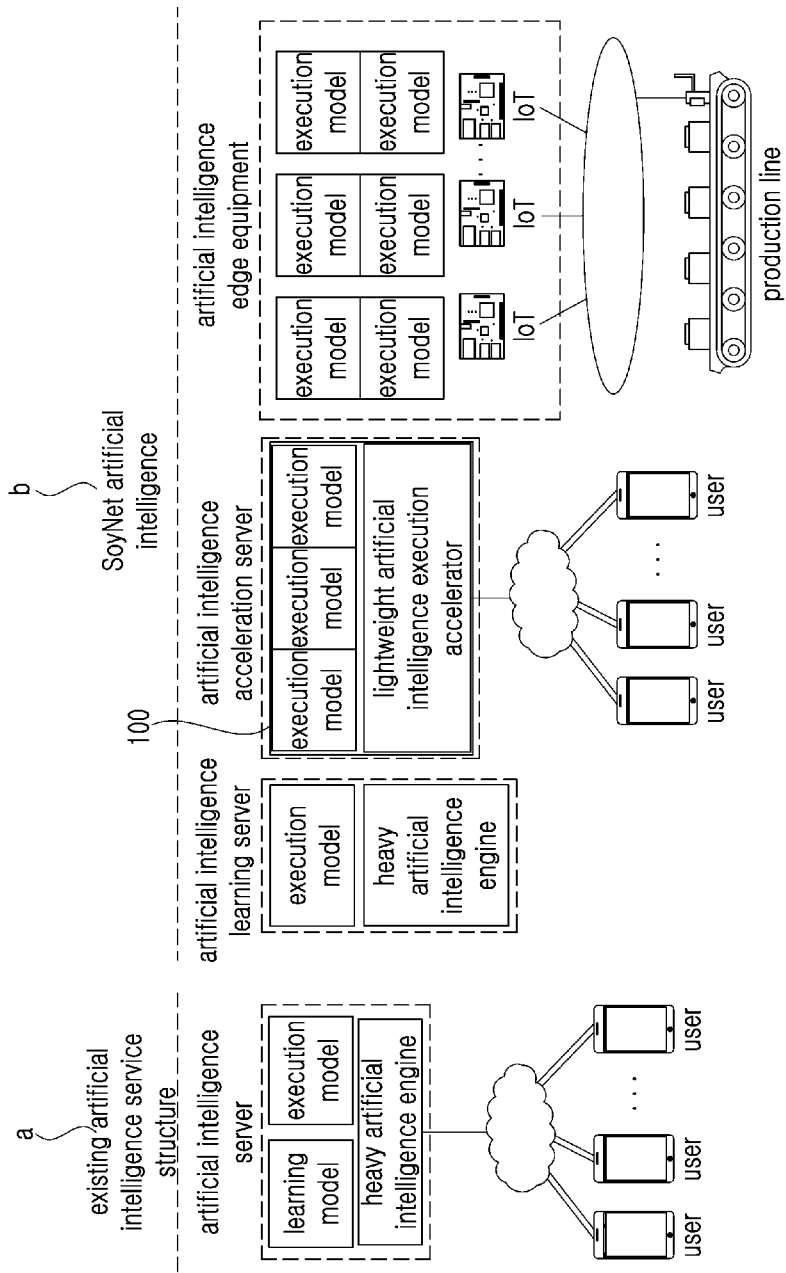

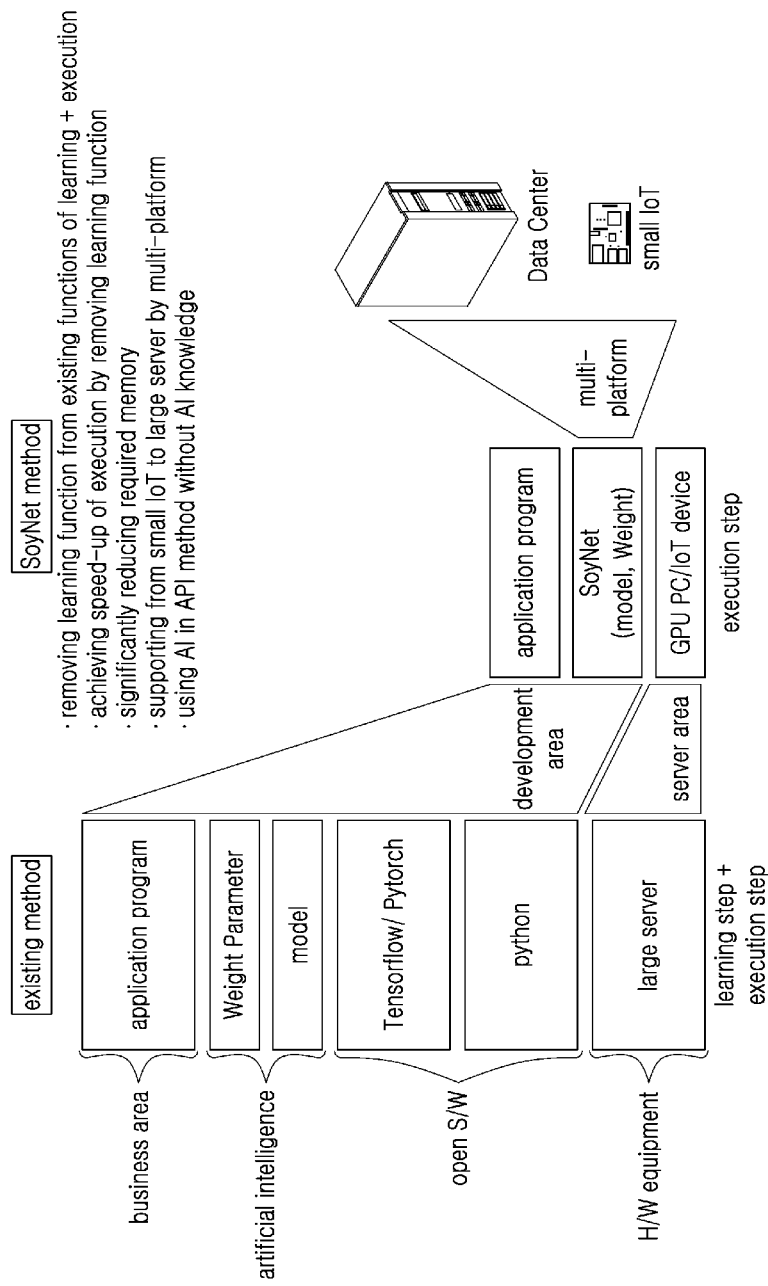
[Fig. 2]

[FIG. 3]
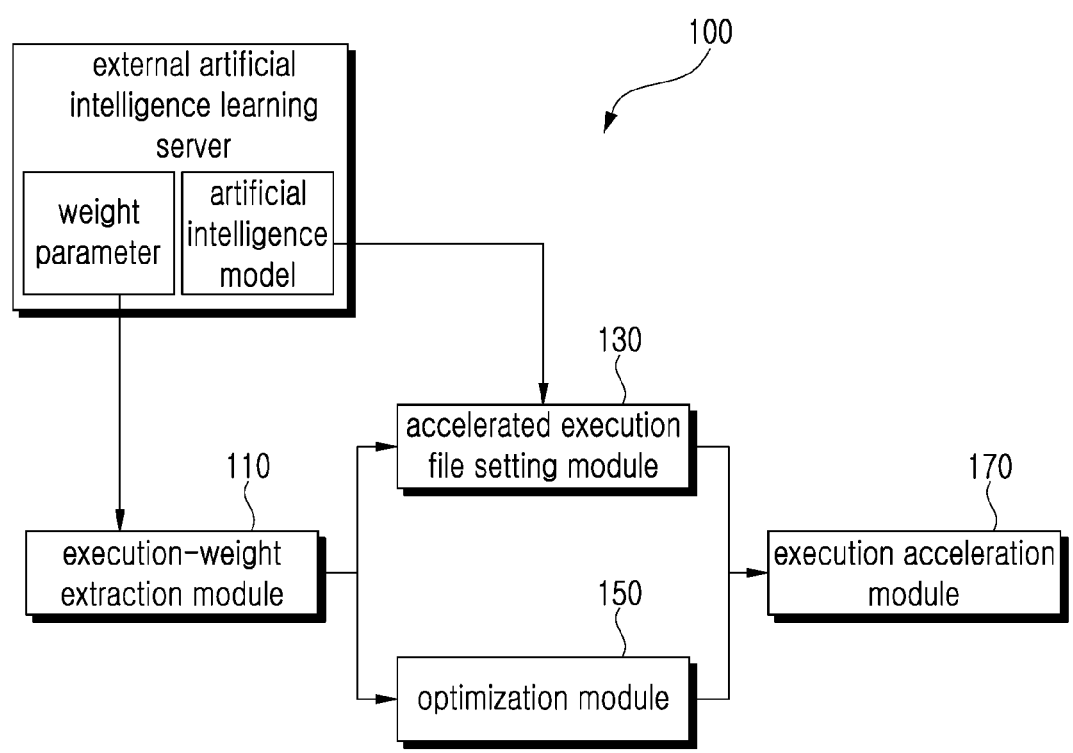

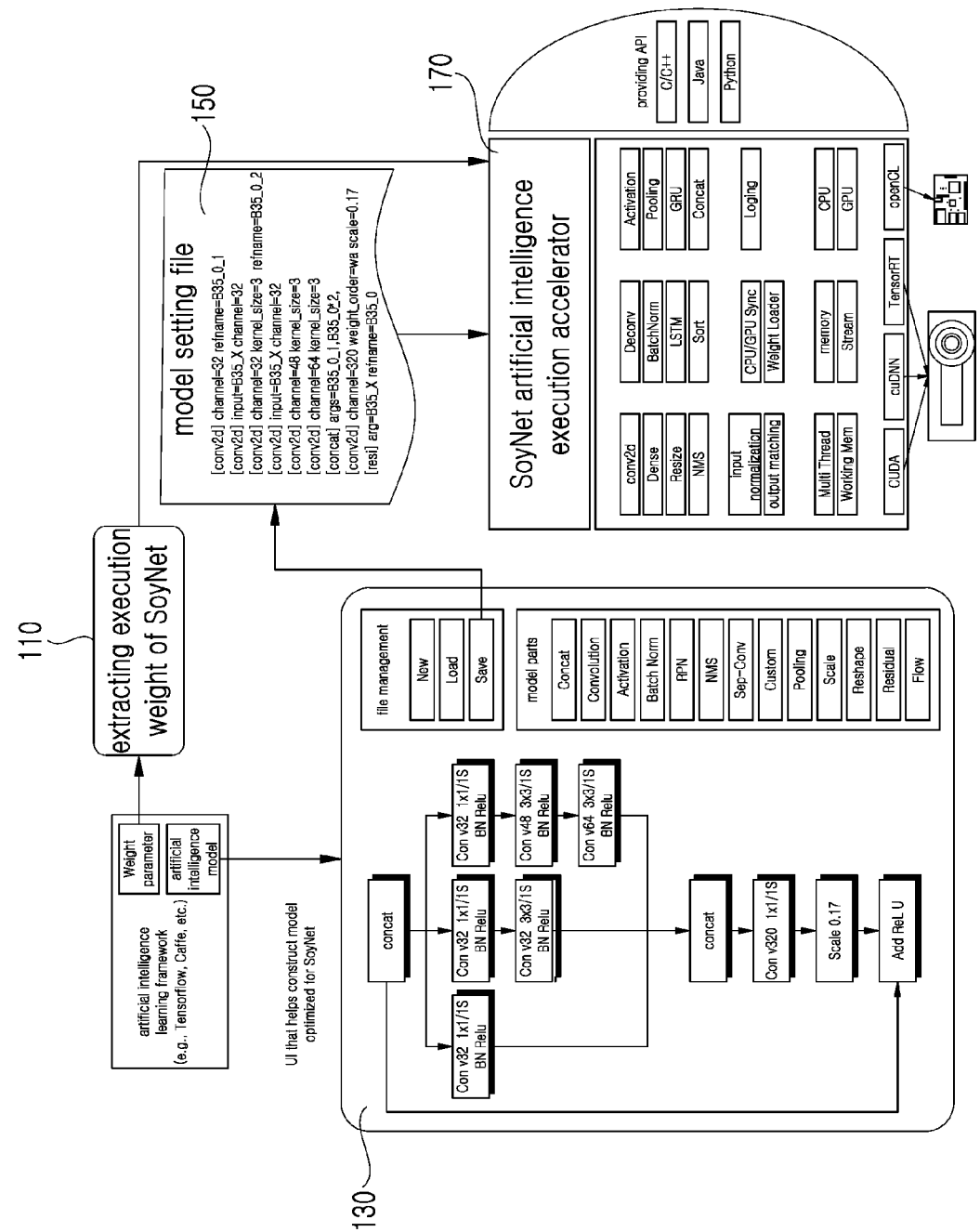
[Fig. 4]

[FIG. 5]
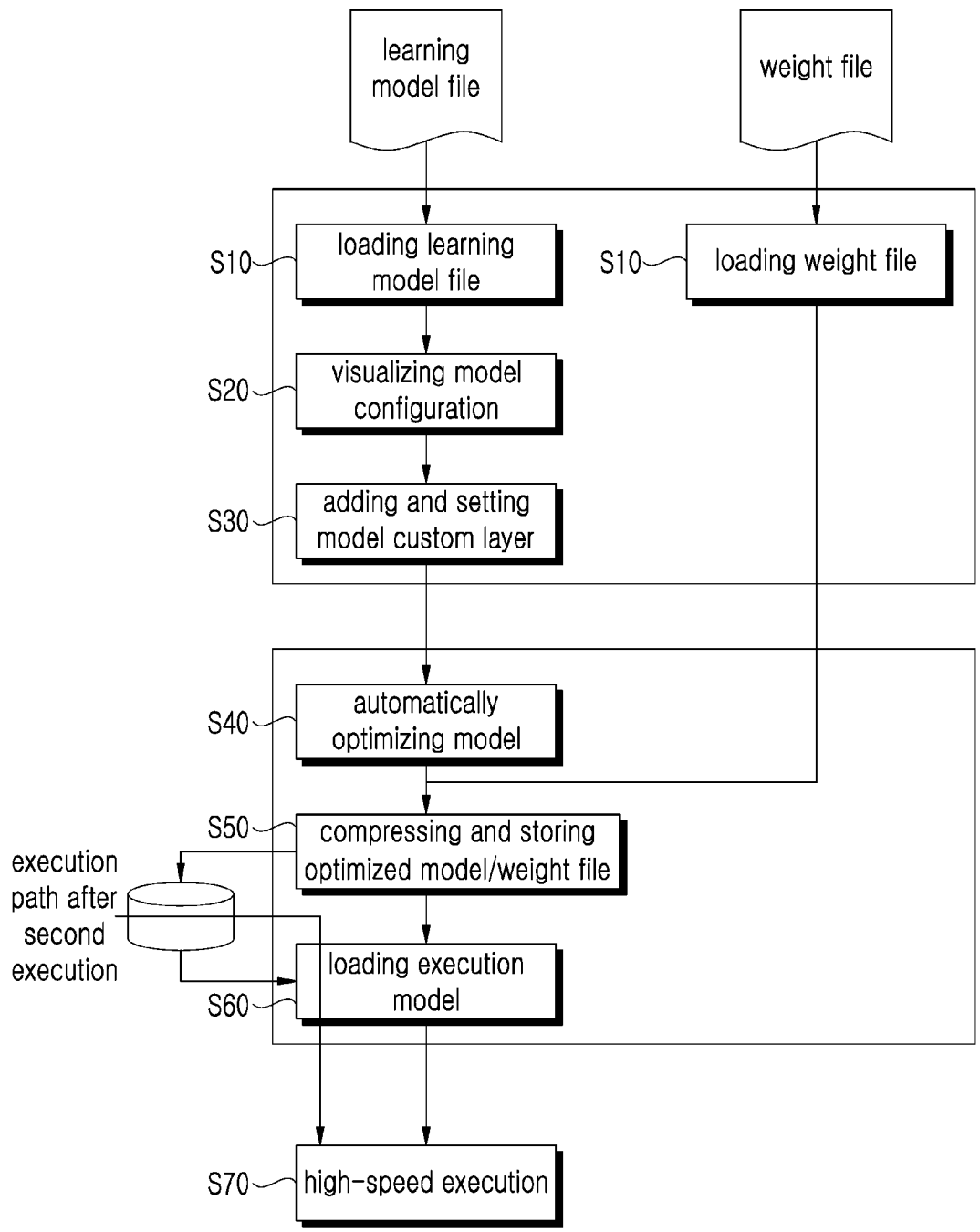

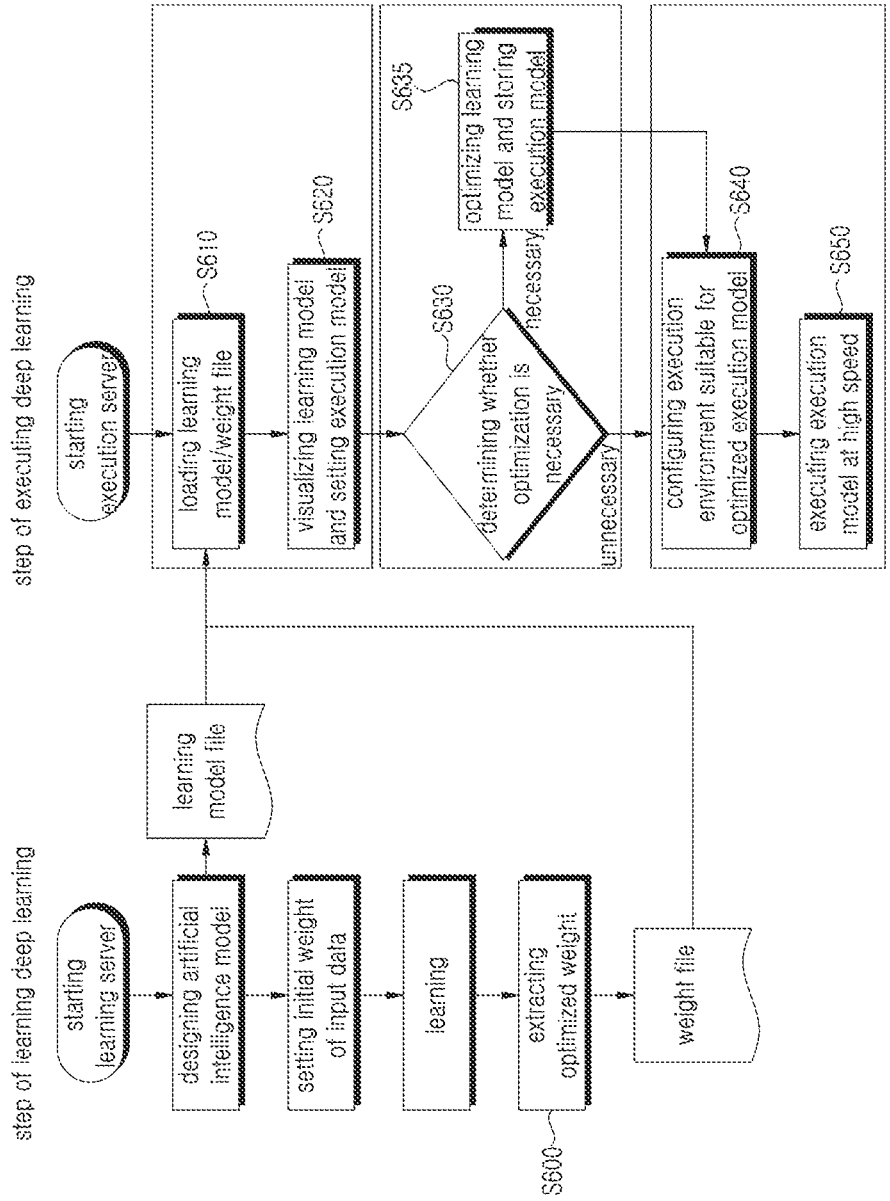
[Fig. 6]

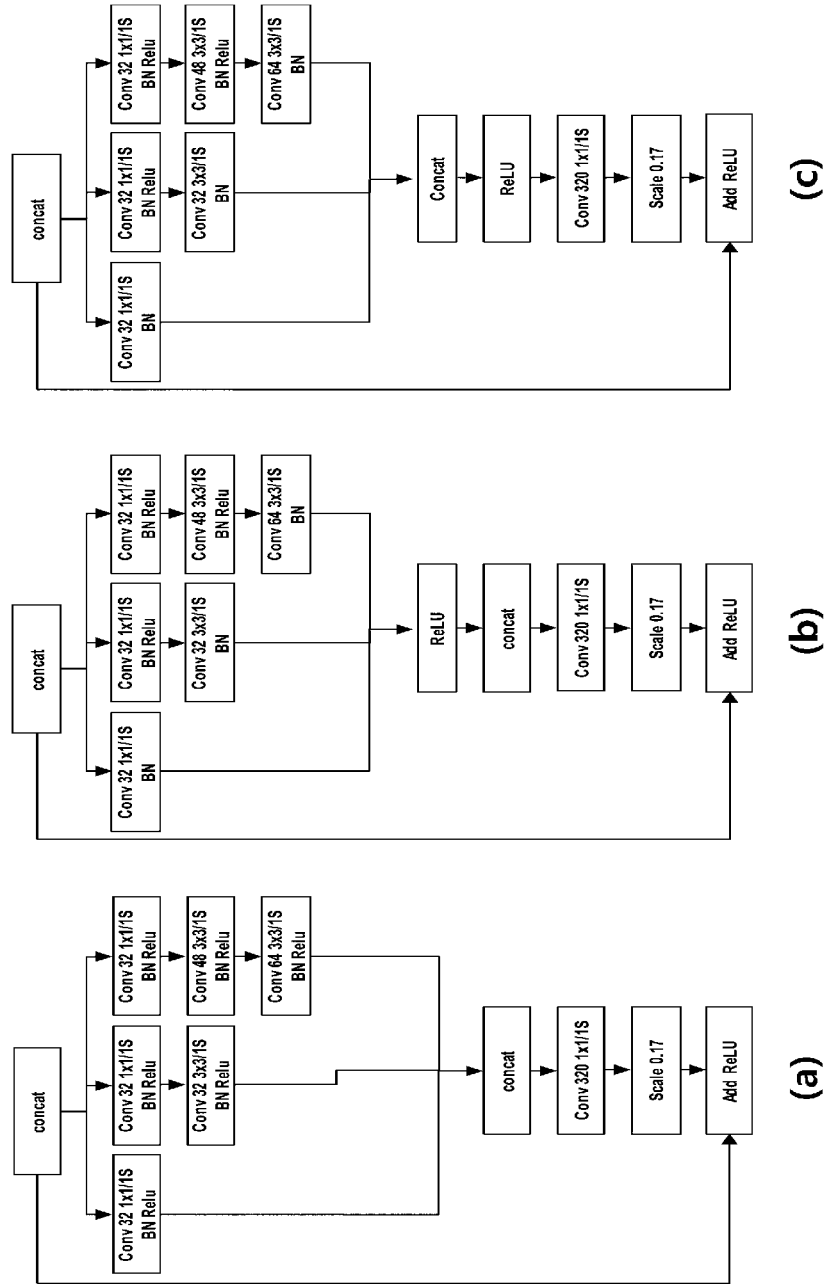
[Fig. 7]

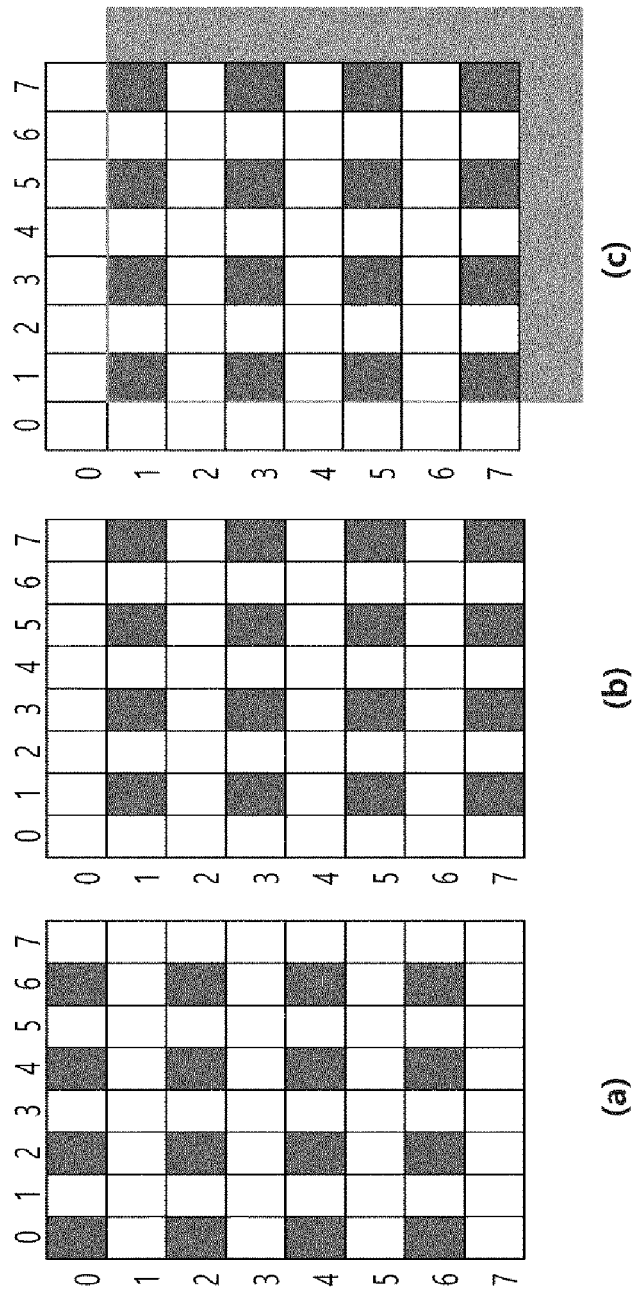
[Fig. 8]

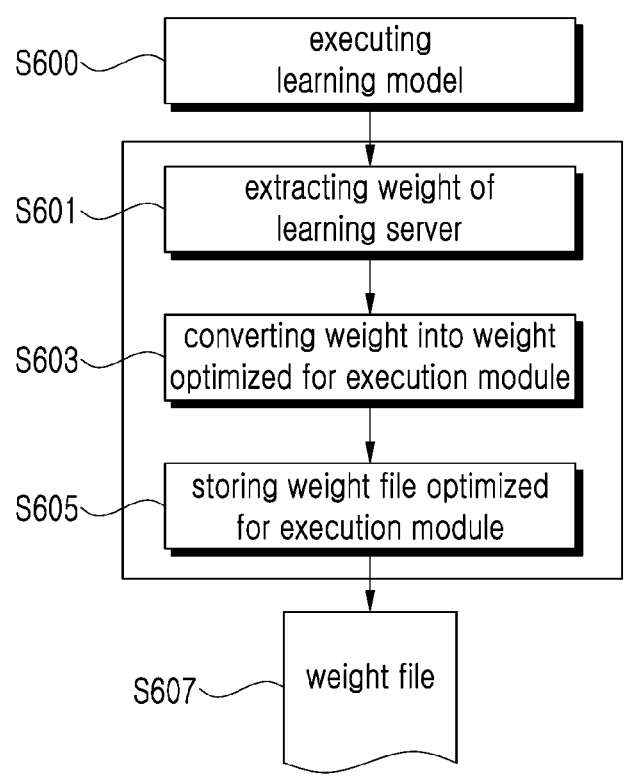
[FIG. 9]

[FIG. 10]
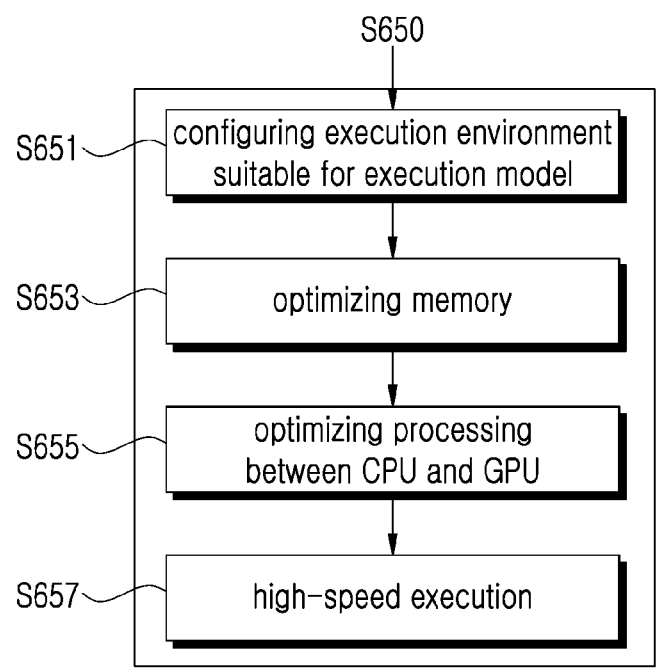

[FIG. 11]
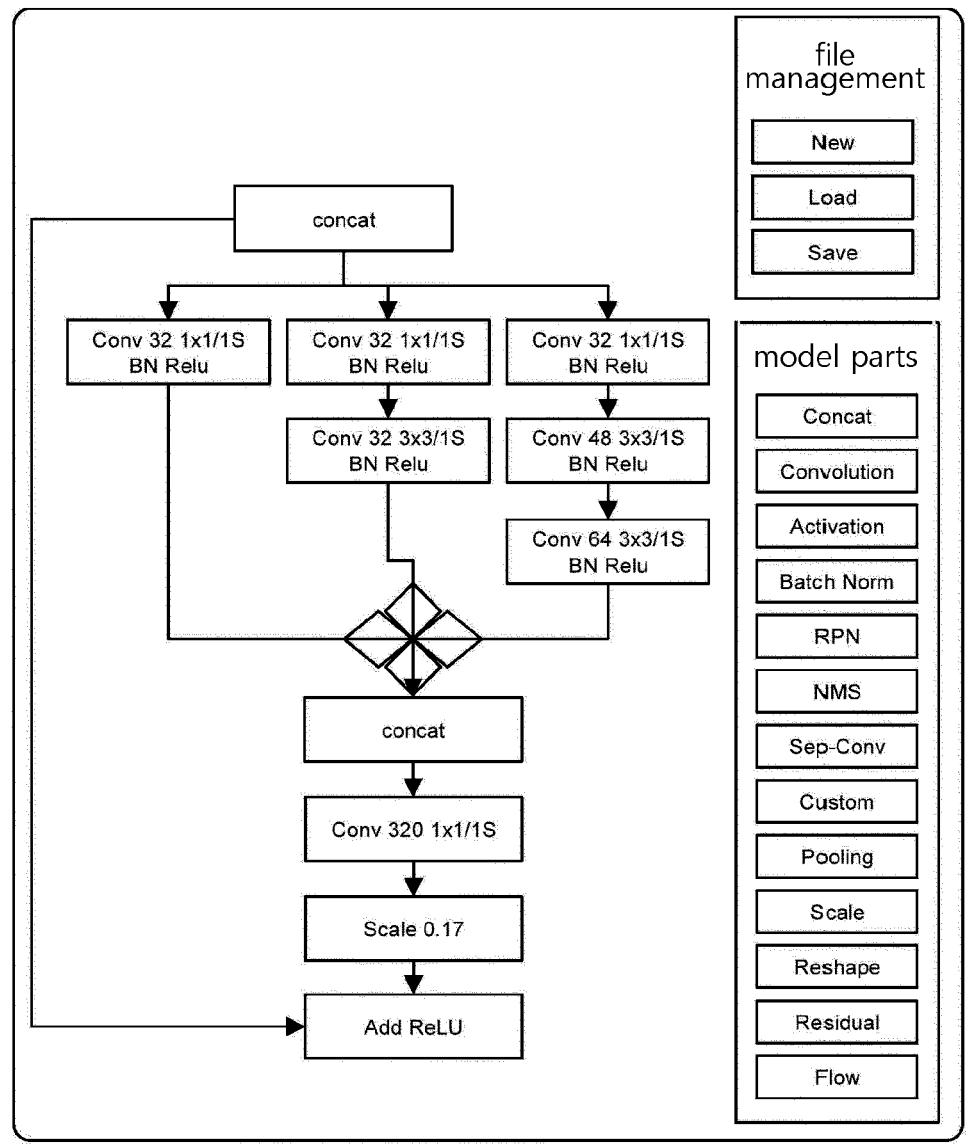

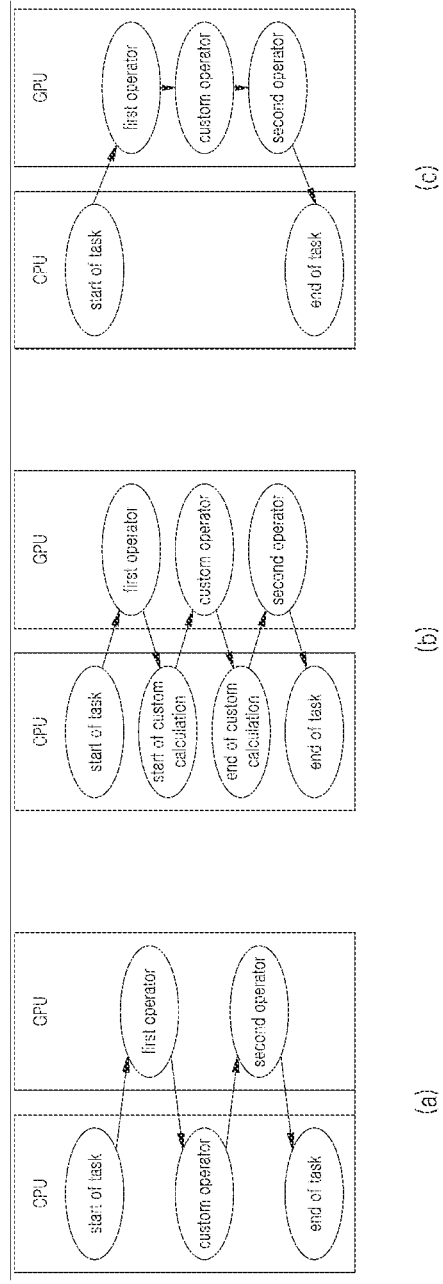
[Fig. 12]

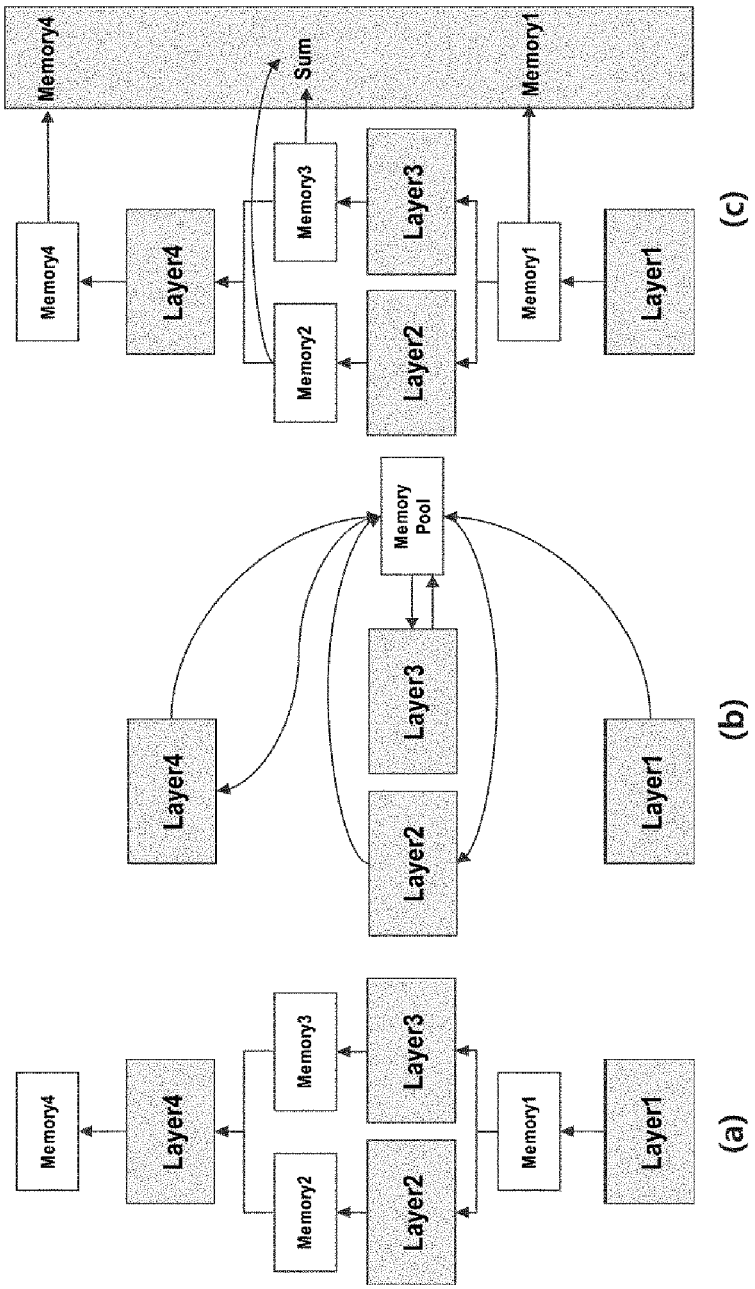
[Fig. 13]

METHOD OF SETTING ARTIFICIAL INTELLIGENCE EXECUTION MODEL AND ARTIFICIAL INTELLIGENCE EXECUTION ACCELERATION SYSTEM FOR ARTIFICIAL INTELLIGENCE EXECUTION ACCELERATION

CROSS-REFERENCE TO RELATED APPLICATION

This application is a Section 371 National Stage Application of International Application No. PCT/KR2018/013795, Nov. 13, 2018, the contents of which is hereby incorporated by reference in its entirety.

TECHNICAL FIELD

The present disclosure relates to an artificial intelligence execution acceleration system and a method of setting an artificial intelligence execution model and, more particularly, to an artificial intelligence execution acceleration system, an artificial intelligence execution acceleration server, and a method of setting an artificial intelligence execution model thereof, wherein the server is configured to remove a learning function and perform only an execution function of artificial intelligence, so as to increase execution speed of artificial intelligence and reduce memory usage.

BACKGROUND ART

Unless otherwise indicated in the present disclosure, the content described in this section is not related art to the claims of this application and is not admitted to be the related art by inclusion in this section.

Artificial intelligence is a field of computer engineering and information technology that studies how to enable computers to perform tasks such as thinking, learning, and self-development that humans can do, and is a technology that allows the computers to imitate the intelligent behavior of humans. In addition, artificial intelligence does not exist by itself, but is directly or indirectly related to other fields of computer science. In particular, in modern times, attempts to introduce artificial intelligence elements in various fields of information technology to utilize the elements for problem solving in those fields have been made very actively, and there is a trend of expanding functions of digital devices by combining artificial intelligence with various aspects of real life.

Artificial intelligence may be largely divided into the server that performs a learning function and the module that performs an execution function. The server performing the learning function collects vast amounts of data, finds features in the data, and performs data processing, such as a data patterning, to train electronic devices, whereas the module performing the execution function processes input data by using the value optimized through learning and provides an inference function based thereon.

Since a learning process of artificial intelligence requires a vast amount of data throughput, artificial intelligence needs a high-performance server and tens of gigabytes of memory. When an execution process of artificial intelligence is performed by using the result of the learning process, the data processing speed is inevitably slow because high-level computational processing such as data recognition, interpretation, and patterning is continuously performed in the learning process.

Even when the Internet is disconnected, the trained artificial intelligence should serve a role, but the conventional cloud-based artificial intelligence service is unable to perform artificial intelligence functions in an environment where connection to the Internet is not possible. In a case where a learning function of artificial intelligence is further installed in an edge terminal, on which artificial intelligence functions are performed, in order to solve this problem, the data processing speed of an artificial intelligence model becomes too slow, causing great inconvenience for practical terminal use for a user.

In addition, in order to develop a program that uses artificial intelligence, program developers should be familiar with difficult artificial intelligence APIs, whereby there exists a limitation in developing the artificial intelligence related programs.

DISCLOSURE

Technical Problem

An objective of the present invention is to provide an artificial intelligence execution acceleration system and a method of setting an execution model of artificial intelligence, wherein a learning function and an execution function of artificial intelligence are separated in order to accelerate execution speed of artificial intelligence, so that only the execution function of artificial intelligence, excluding the learning function thereof, is performed in a smart device at an edge of an artificial intelligence system.

In particular, as for a weight value used by an artificial intelligence execution acceleration server according to an exemplary embodiment, the weight value optimized for the execution model is generated by extracting a weight file from an external learning server, and is applied to the execution model, so that data processing speed of an artificial intelligence execution module is accelerated.

Technical Solution

An artificial intelligence execution acceleration system according to an exemplary embodiment includes: an execution weight extraction module for calculating a data weight of a learning model of artificial intelligence for artificial intelligence execution acceleration in the learning model that includes an artificial intelligence model and a weight file generated as a result of artificial intelligence learning; an artificial intelligence accelerated execution file setting module for loading the learning model from an artificial intelligence learning server that calculates the learning model, converting the loaded learning model into a custom layer usable in the artificial intelligence execution acceleration system, and then optimizing the custom layer through the process of adjusting an operation function and a module position and modifying an operation method to calculate an execution model; and an execution acceleration module for receiving the execution model, configuring an execution environment corresponding to the execution model, and accelerating execution speed of artificial intelligence.

Advantageous Effects

The artificial intelligence execution acceleration server as described above reduces a required amount of memory and hardware resources (i.e., CPU and GPU) by separating the learning function and execution function of artificial intelligence from each other, so that the server costs for executing an artificial intelligence model may be reduced, the processing performance may be improved, and the artificial intelligence model may be executed even on an edge device having a lower specification, thereby enabling a service using artificial intelligence to be provided even in a situation where connection to the Internet is not possible.

Through the exemplary embodiment, the artificial intelligence model that must be executed on an expensive server may be executed on a PC-class device, and the artificial intelligence model may be quickly executed with a small memory even in a small IoT device.

In addition, since the exemplary embodiment uses a method in which the artificial intelligence model is loaded in a setting method and a previously trained weight file is executed by being loaded into an edge terminal engine, so that even general developers who do not know artificial intelligence may develop programs that use artificial intelligence.

The effects of the present invention are not limited to the above effects, and should be understood to include all effects that can be inferred from the detailed description of the present invention or the configuration of the present invention described in the claims.

DESCRIPTION OF DRAWINGS

FIG. 1 is a view for comparing a structure of a conventional artificial intelligence service and a structure of an artificial intelligence execution acceleration system according to an exemplary embodiment.

FIG. 2 is a view for comparing functions of a conventional artificial intelligence system and functions of the artificial intelligence execution acceleration system according to the exemplary embodiment.

FIG. 3 is a view showing a data processing block of an artificial intelligence execution acceleration server according to the exemplary embodiment.

FIG. 4 is a view for explaining a function of each component included in the artificial intelligence execution acceleration system according to the exemplary embodiment.

FIG. 5 is a view showing data processing of an accelerated execution file setting module 130 and an optimization module 150.

FIG. 6 is a view showing data processing required in an artificial intelligence learning process occurring in an external learning server and the data processing of the accelerated execution file setting module 130 and the optimization module 150, which are performed in the artificial intelligence execution server.

FIG. 7 is a view showing an optimization process of a custom layer according to the exemplary embodiment.

FIG. 8 is a view for explaining the optimization process by modifying an operation method in the optimization process of the custom layer according to the exemplary embodiment.

FIG. 9 is a view showing a process of extracting a weight file according to the exemplary embodiment.

FIG. 10 is a view showing a process of high-speed execution of an execution model according to the exemplary embodiment.

FIG. 11 is a view showing a function block of an artificial intelligence execution model setting module according to the exemplary embodiment.

FIG. 12 is a view for explaining a plug-in use function of a custom operator according to the exemplary embodiment.

FIG. 13 is a view showing a learning process of artificial intelligence for explaining a memory optimization process according to the exemplary embodiment.

BEST MODE

A method of setting an artificial intelligence execution model for artificial intelligence execution acceleration according to another exemplary embodiment includes: (A) loading, from an artificial intelligence learning server, a weight file generated as a result of learning in the artificial intelligence learning server and a learning model including an artificial intelligence model; (B) visualizing metadata of the learning model in the learning model by using an operation function including convolution and ReLU, by an artificial intelligence accelerated execution file setting module; (C) setting a visualized learning model file as a custom layer usable in an artificial intelligence execution accelerator by using custom layer setting functions including NMS (non-maximum suppression) and pooling, by the artificial intelligence accelerated execution file setting module; (D) converting the custom layer into the execution model usable in the artificial intelligence execution accelerator by adding the loaded weight file to the custom layer, by the artificial intelligence accelerated execution file setting module; and (E) accelerating execution speed of artificial intelligence by receiving the execution model from an artificial intelligence execution acceleration module and configuring an execution environment corresponding to the execution model.

MODE FOR INVENTION

Advantages and features of the present invention and the methods of achieving the same will become apparent with reference to an exemplary embodiment described below in detail in conjunction with the accompanying drawings. However, the present invention is not limited to the exemplary embodiments disclosed below, but will be implemented in a variety of different forms. These exemplary embodiments are provided only to complete the disclosure of the present invention and to completely inform the scope of the present invention to those skilled in the art to which the present invention pertains, and the present invention is only defined by the scope of the claims. Like reference numerals generally denote like elements throughout the present disclosure.

In the following description of the exemplary embodiment of the present invention, it is to be noted that, when a detailed description of a known function or configuration may unnecessarily obscure the subject matter of the present invention, the detailed description thereof will be omitted. In addition, terms to be described later are terms defined in consideration of functions in the exemplary embodiment of the present invention, which may vary according to the intention or custom of users or operators. Therefore, definitions of these terms should be made based on the contents throughout the present specification.

FIG. 1 is a view for comparing a structure of a conventional artificial intelligence service and a structure of an artificial intelligence execution acceleration system according to an exemplary embodiment to aid understanding, and FIG. 2 is a view for comparing functions of a conventional artificial intelligence system and functions of the artificial intelligence execution acceleration system according to the exemplary embodiment.

Referring to FIGS. 1 and 2, the conventional artificial intelligence service system is composed of a system in which a learning function and an execution function are combined. Meanwhile, the artificial intelligence execution acceleration system according to the exemplary embodiment is configured to have only an artificial intelligence execution acceleration server from which a system configuration of a learning step is removed, and the artificial intelligence execution acceleration server is configured to perform only an execution function of artificial intelligence. In the artificial intelligence execution acceleration system according to the exemplary embodiment, a learning function of artificial intelligence is removed to improve execution speed of functions of artificial intelligence in an edge terminal of an artificial intelligence system. In addition, by providing the artificial intelligence system having the learning function removed, the execution function of artificial intelligence may be accelerated and a memory required for artificial intelligence execution may be drastically reduced. In addition, with the multi-platform provided in the exemplary embodiment, it is possible to support the functions of artificial intelligence for devices from small IoT devices to large servers. In addition, it is possible for program developers without coding knowledge of artificial intelligence programs to implement artificial intelligence functions in an API (application programming interface) method.

FIG. 3 is a view showing a data processing block of the artificial intelligence execution acceleration server according to the exemplary embodiment, and FIG. 4 is a view for explaining the function of each component included in the artificial intelligence execution acceleration system according to the exemplary embodiment.

Referring to FIGS. 3 and 4, an artificial intelligence execution acceleration server 100 according to the exemplary embodiment may be configured to include: an execution weight extraction module 110, an accelerated execution file setting module 130, an optimization module 150, and an execution acceleration module 170. The term "module" used in this specification should be interpreted as being able to include software, hardware, or a combination thereof, depending on the context in which the term is used. For example, the software may be a machine language, a firmware, an embedded code, and an application software. As another example, the hardware may be a circuit, a processor, a computer, an integrated circuit, an integrated circuit core, a sensor, a MEMS (Micro-Electro-Mechanical System), a passive device, or a combination thereof.

First, an artificial intelligence learning server is a cloud server that collects learning data necessary for performing artificial intelligence such as machine learning and deep learning. Then, in order to extract features from the learning data, each weight value is calculated for each dimension of the learning data, and the calculated weight values are accumulated to learn data patterns. An external artificial intelligence learning server generates weight parameters and artificial intelligence models as a result of the learning.

The execution weight extraction module 110 calculates a data weight of a learning model of artificial intelligence for accelerating the execution of artificial intelligence in the learning model that includes an artificial intelligence model and a weight file generated as a result of artificial intelligence learning. In the exemplary embodiment, the weight value may be a weight value for each condition of a control result value according to an actual condition input to an electronic device.

The accelerated execution file setting module 130 loads a learning model from the artificial intelligence learning server that calculates the learning model including an artificial intelligence model and a weight file generated as a result of artificial intelligence learning, generates a custom layer usable in the artificial intelligence execution acceleration system by visualizing the loaded learning model, and calculates an execution model.

The optimization module 150 checks whether or not the custom layer is optimized, and performs an automatic optimization process in a case where an additional optimization process is unnecessary. In the exemplary embodiment, the optimization process may be performed by an optimization operation function including concat, convolution, activation, RPN (region proposal network), NMS (non-maximum suppression), pooling, etc. When the optimization of the custom layer is completed, an execution model is generated, and after that, the optimization module 150 applies the weight value of the execution model, received from the execution weight extraction module 110, to the execution model.

The execution acceleration module 170 receives the execution model and configures an execution environment corresponding to the execution model, so as to accelerate the execution speed of artificial intelligence. Unlike the conventional artificial intelligence software in which a learning function and an execution function are combined with each other, the execution acceleration module 170 according to the exemplary embodiment is configured to remove the learning function and perform only the execution function of artificial intelligence. In this way, it is possible to increase the instruction processing speed of artificial intelligence and reduce memory usage. In particular, when the execution module of artificial intelligence is installed in a small IoT device such as Android and Raspberry Pi, the execution acceleration module 170 enables faster data processing than that of a conventional machine learning engine such as TensorFlow and Caffe.

In addition, the execution acceleration module 170 may calculate an optimum value of allocating the memory required for each execution step of the execution model, and check completion of each execution step including parallel processing, so as to reuse a memory area from which data not reused in the completed step was deleted, thereby implementing memory optimization. Specifically, the execution acceleration module 170 checks the completion of each of numerous calculation processing, and deletes all unnecessary data in the step in which data processing is completed. In this case, while saving only the data obtained as a calculated result value in each step, the other data used for calculating the result value is regarded as unnecessary data not to be used again and may be deleted. The execution acceleration module 170 may optimize the memory of the artificial intelligence execution acceleration module by reusing a spare memory area generated after deleting the unnecessary data in the step where the processing is completed.

Hereinafter, data processing of each module constituting the artificial intelligence acceleration execution system according to the exemplary embodiment will be described in more detail.

FIG. 5 is a view showing data processing of an accelerated execution file setting module 130 and an optimization module 150.

In step S10, the accelerated execution file setting module 130 loads a learning model from an external artificial intelligence learning server. The learning model is data including an artificial intelligence model and a weight file generated as a result of artificial intelligence learning in the external learning server.

In step S20, a configuration of the learning model is visualized by the accelerated execution file setting module 130. For example, in the process of visualizing the configuration of the learning model, metadata of the learning model is visualized by using an operation function including convolution and ReLU, and the visualized learning model is converted into a custom layer. In addition, in step S20, the visualized learning model file may be set as the custom layer usable in the artificial intelligence execution accelerator by using a model setting function including RPN (region proposal network), NMS (non-maximum suppression), pooling, etc.

In step S40, the custom layer is automatically optimized to calculate the execution model by the accelerated execution file setting module 130. In the exemplary embodiment, a layer optimization process may be implemented by combining functions composed in a model part of an execution model setting module shown in FIG. 4.

In step S50, the optimized weight file is loaded from the execution weight extraction module 110, and is applied to the execution model. Thereafter, the optimized execution model and weight file are compressed and stored.

In step S60, when the artificial intelligence function is executed again, the previously stored execution model is loaded. In step S70, the optimized execution model is loaded from the execution acceleration module 170 to make data processing possible, thereby enabling the artificial intelligence functions to be accelerated.

FIG. 6 is a view showing data processing required in the artificial intelligence learning process occurring in the external learning server and data processing of the accelerated executable file setting module 130 and the optimization module 150, which are performed in the artificial intelligence execution server.

The data processing in a learning step of deep learning shown in FIG. 6 is an example of the data processing implemented in a learning step of artificial intelligence, and is the data processing that is not operated within the artificial intelligence acceleration execution system, but is performed in an external learning server outside the system.

When a learning function of deep learning starts in the external learning server outside the system, an artificial intelligence model is designed and an artificial intelligence learning model file is generated.

After that, the process of analyzing input/output data and setting an initial weight is repeatedly performed to train the input/output data, and an optimum value of the weight of the detailed input/output data is calculated.

In step S600, a weight file is generated by extracting the optimized weight file.

In the artificial intelligence acceleration system, an artificial intelligence execution model is generated by using the learning model file and the weight file generated in the external learning server. Hereinafter, a process of generating the artificial intelligence execution model will be described with reference to FIG. 6.

When an artificial intelligence execution acceleration server is started, in step S610, an execution weight extraction module 110 loads a learning file, including a learning model and a weight file, from an external learning server.

In step S620, the learning model is visualized through metadata analysis of the learning model, and a custom layer is set by using the loaded weight file.

Thereafter, in step S630, it is determined whether or not optimization of the custom layer is necessary.

An execution model of a customizing layer is generated and saved. The optimization process according to the exemplary embodiment may vary depending on the type and use function of the learning model. In step S640, an execution environment corresponding to the execution model optimized after the optimization process is configured.

In step S630, when it is determined that optimization of the custom layer is unnecessary, the process enters step S640, and in step S650, the artificial intelligence function is allowed to be executed at a high speed by using the execution model in which the optimization of the custom layer is completed.

FIGS. 7 to 10 are views showing the optimization process of the custom layer according to the exemplary embodiment.

FIG. 7 is a view explaining an example of optimizing the custom layer by adjusting a position and order of module calculation of the custom layer.

As shown in FIG. 7, in the exemplary embodiment, an execution model may be generated by adjusting an operation function and the position and order of the module calculation in the optimization process of the custom layer and performing the layer optimization.

ReLU (rectified linear unit) operation performs a calculation through a formula ReLU=max(0, x) for each element value of an input x of a multi-dimensional matrix. Since this calculation is a unary operation that is an operation with a single input without mixing with other input values, parallel processing becomes possible. (Parallel processing is possible only when there is no cross-reference dependence on each result value between calculation units in a calculation process.) In the leftmost first view in FIG. 7, when ReLUs having a structure thereof being eventually combined into one ReLU are executed as shown in (b) of FIG. 7, the ReLU calls that are divided into three calls may be reduced to a single call. When the ReLUs are divided into three calls as shown in (a) in FIG. 7, a calculation module is unable to determine the possibility of parallel processing between these elements, so the three function calls are serially executed three times in order to safely perform calculations. However, when combining the ReLU calculations into the single call and explicitly signaling that the parallelism is present, the three function calls are performed at the same time, thereby improving the speed.

In (b) of FIG. 7, ReLU calculation is performed on each memory separated and arranged in three locations. Concat serves a role of gathering calculation target values in each memory scattered in the three locations into a single location. In this way, the digits that are present in a continuous memory is synchronized with an access method of a cache memory to improve the speed.

FIG. 8 is a view for explaining an optimization process by modifying an operation method in the optimization process of the custom layer according to the exemplary embodiment.

The example shown in FIG. 8 is an example of using a plug-in of a custom operator to modify an existing multi-step operation method into a single step operation method.

The (a) of FIG. 8 shows an Even selection operation in which only even terms are selected from a matrix of size 8×8.

The method of implementing the Even selection operation in artificial intelligence is performed by using parameters of an average pooling function set as kernel size=1×1 and stride size=2×2. This operation is simply expressed as AvgPool 1×1/2.

(b) of FIG. 8 shows an OddSelection operation for extracting odd-numbered terms. A method of implementing this operation by using a traditional artificial intelligence operation method is to crop cell parts from cell (1,1) to cell (7,7) in the second view in FIG. 8 and cut the cell parts out, apply padding of red parts in the third view in FIG. 8, and perform the operation of AvgPool 1×1/2. To summarize the sequence, the operation of the OddSelection is implemented in three steps in an equation: OddSelection=Crop+Padding+AvgPool 1×1/2. As shown in the second view in FIG. 8, the three-step processing of the operation may be directly implemented as one-step processing of OddSelection, so as to improve the speed.

FIG. 9 is a view showing a process of extracting a weight file according to the exemplary embodiment.

Referring to FIG. 9, in step S601, the execution weight extraction module 110 first extracts a weight of a learning model of an external learning server.

In step S603, the weight of the extracted learning model is converted into the weight optimized for an artificial intelligence acceleration execution module, and in step S605, the weight file optimized for the artificial intelligence acceleration execution module is stored.

FIG. 10 is a view showing a process of high-speed execution of an execution model according to the exemplary embodiment.

In the exemplary embodiment, for high-speed execution of the artificial intelligence execution model, in step S651, an execution acceleration module 170 establishes an execution environment suitable for the execution model. Thereafter, in step S653, a memory optimization process of the execution acceleration module 170 is performed, and in step S655, optimization of processing between CPU and GPU is performed.

In step S657, the execution acceleration module implements the high-speed execution of the artificial intelligence execution model.

FIG. 11 is a view showing a function block of an artificial intelligence execution model setting module according to the exemplary embodiment.

As shown in FIG. 11, the artificial intelligence model is constructed by assembling operators such as convolution, ReLU, batch normalization, concat, and pooling, which are standardized to some extent, in a Lego block method. However, the artificial intelligence model that is actually implemented is insufficient with only the operators in the Lego block method, and thus, the artificial intelligence model inevitably uses an operation that is not previously provided. Custom operators of artificial intelligence added in this way are often not operators optimized for high speed. Artificial intelligence operations require the use of a GPU having a high parallel processing speed, but in most cases, artificial intelligence operators added to the basic operations are often implemented in a method that uses a CPU. In order to be applicable to an industrial field, it is necessary to use an operator different from a standard operator, and the non-standard operator must be implemented and used directly at the industrial field. These are called custom operator plug-ins, and there are three methods as follows to operate the custom operator plug-ins.

FIG. 12 is a view for explaining a plug-in use function of a custom operator according to the exemplary embodiment.

Referring to FIG. 12, the method shown in (a) is a method of operating a custom plug-in in a CPU, which requires communication time between the CPU and a GPU, and is implemented with the CPU that is slower than the GPU, thereby causing much hindrance to the speed.

In the method shown in (b) of FIG. 12, a function itself for calculation is implemented in the GPU, but since the CPU manages control, this method represents a case in which a large amount of communication time between the CPU and the GPU is required. Likewise, a loss in the speed occurs.

The method shown in (c) of FIG. 12 is a speed-optimized method implemented in the artificial intelligence acceleration module according to the exemplary embodiment. The CPU controls only the start and end of tasks, and the rest of the operations are processed in batch by the GPU in an async method. The CPU and the communication time for control signals are not needed to use the custom operator, and also the custom operator is implemented in the GPU. That is, the artificial intelligence execution acceleration module according to the exemplary embodiment achieves speed improvement by using a GPU method for an operator that has not been previously implemented by the GPU. When using the operator implemented in this way, the implemented operator is inserted between the existing GPU operators, so as to be performed in a non-synchronous way with the CPU inside the GPU without being controlled by the CPU, thereby achieving the speed improvement.

FIG. 13 is a view showing a learning process of artificial intelligence for explaining the memory optimization process according to the exemplary embodiment.

Referring to FIG. 13, the memory of the artificial intelligence execution acceleration module is saved through the memory optimization process performed in the exemplary embodiment. In order to perform back-propagation, which is a key procedure in the learning of artificial intelligence shown in FIG. 13, the calculated result of each layer must be stored. When the back-propagation operation is completed, the corresponding memory becomes reusable. However, the memory required in the execution step may use much less memory, as described below, and the required amount of memory may be flexible. (a) of FIG. 13 shows memory capacity required for learning. The total capacity of Memory1+Memory2+Memory3 is required.

(b) of FIG. 13 shows the memory required for the execution step. When a layer is executed, the previously used memory is no longer used, and thus the memory may be reused in the next layer. When applying these features to the entire artificial intelligence model and operating the memory in a memory pool mode by calculating the maximally required memory in advance, the required amount of memory may be drastically reduced.

(c) of FIG. 13 represents calculation of a required amount of a memory pool. The memory used in the artificial intelligence execution step is a GPU memory, and the GPU operates in the async mode independently of the CPU, so once control is transferred to the GPU, the CPU is unable to determine when the memory is used and when the memory usage is no longer needed. Therefore, the required scheduling for the memory used by the GPU must be determined in advance before the control is transferred to the GPU. Referring to such scheduling of memory usage shown in (c) of FIG. 13, the maximum memory usage is extracted for each layer. Since layer1 and layer4 extract the memory usage as much as expected, and layer2 and layer3 may be processed in parallel, each of their usage is summed and extracted. In the exemplary embodiment, the maximum value of memory usage of each layer thus extracted is calculated as the maximum memory required by the present artificial intelligence model, and is used in the execution step. Such a calculation and use procedure may be achieved automatically in the system.

The artificial intelligence execution acceleration system as described above reduces the required amount of memory and hardware resources (i.e., CPU and GPU) by separating the learning function and the execution function of artificial intelligence from each other, so that the server costs for executing the artificial intelligence model may be reduced, the processing performance may be improved, and the artificial intelligence model may be executed even on low-spec edge devices, thereby enabling the service using artificial intelligence to be provided even in the situations where connection to the Internet is not possible.

Through the exemplary embodiment, the artificial intelligence model that must be executed on an expensive server may be executed on a PC-class device, and the artificial intelligence model may be quickly executed with a small memory even in a small IoT device.

In addition, since the exemplary embodiment uses a method in which the artificial intelligence model is loaded in a setting method and a previously trained weight file is executed by being loaded into an edge terminal engine, so that even general developers who do not know artificial intelligence may develop programs that use artificial intelligence.

The disclosed subject matter is only an example, and without departing from the idea claimed in the claims, various modifications may be made by those skilled in the art, so the scope of protection of the disclosed subject matter is not limited to the specific exemplary embodiment described above in detail.

INDUSTRIAL APPLICABILITY

The artificial intelligence execution acceleration server as described above reduces a required amount of memory and hardware resources (i.e., CPU and GPU) by separating a learning function and an execution function of artificial intelligence from each other, so that the server costs for executing an artificial intelligence model may be reduced, the processing performance may be improved, and the artificial intelligence model may be executed even on low-spec edge devices, thereby enabling a service using artificial intelligence to be provided even in situations where connection to Internet is not possible. In addition, the artificial intelligence model that must be executed on an expensive server may be executed on a PC-class device, and the artificial intelligence model may be quickly executed with a small memory even in a small IoT device.

The invention claimed is:

1. An artificial intelligence execution acceleration system comprising:
   an execution weight extraction module for calculating a data weight of a learning model of artificial intelligence for artificial intelligence execution acceleration in the learning model that includes an artificial intelligence model and a weight file generated as a result of artificial intelligence learning;
   an artificial intelligence accelerated execution file setting module for loading the learning model from an artificial intelligence learning server that calculates the learning model, converting the loaded learning model into a custom layer configured for use in the artificial intelligence execution acceleration system, and then optimizing the custom layer through a process of adjusting an operation function and a module position and modifying an operation method to calculate an execution model;
   an optimization module for performing an optimization process of the custom layer with an optimization operation function configured to perform a ReLU operation after a Concat operation so as to perform ReLU operations as a single operation, generating the execution model when optimization of the custom layer is completed, and then applying a weight value of the execution model received from the execution weight extraction module to the execution model; and
   an execution acceleration module for receiving the execution model, configuring an execution environment corresponding to the execution model, and accelerating execution speed of artificial intelligence,
   wherein the execution acceleration module calculates an optimum value of an allocated amount of a memory required for each execution step of the execution model, checks completion of each execution step including parallel processing, reuses a memory area from which data not reused in a completed step was deleted, transforms data processing between a CPU and a GPU, and processes the execution model of artificial intelligence inside the GPU in an async mode to minimize an occurrence of overhead,
   the artificial intelligence accelerated execution file setting module generates the custom layer by visualizing metadata of the learning model by using operation functions including convolution and ReLU in the learning model of artificial intelligence, sets a visualized learning model file as the custom layer by using model setting functions including RPN (region proposal network), NMS (non-maximum suppression), and pooling,
   the artificial intelligence accelerated execution file setting module adjusts the module position of the custom layer by combining the ReLU operations into the single operation and notifying that parallelism is present, and modifies a pooling operation method of the custom layer by an Even selection operation that selects only even terms from a matrix and an Odd selection operation that extracts odd terms from the matrix,
   the Even selection operation is performed by calculating AvgPool 1×1/2 (where, kernel size=1×1, stride size=2× 2) according to an average pooling method, and
   the Odd selection operation is performed by calculating AvgPool 1×1/2 after cropping and padding according to a crop method, a padding method, and the average pooling method.

2. The artificial intelligence execution acceleration system of claim 1, wherein the execution weight extraction module extracts a weight file format previously stored in the artificial intelligence learning server.

3. A method of setting an execution model of artificial intelligence for artificial intelligence execution acceleration, the method comprising:
   (A) loading, from an artificial intelligence learning server, a weight file generated as a result of learning in the artificial intelligence learning server and a learning model including an artificial intelligence model;
   (B) visualizing metadata of the learning model in the learning model by using operation functions including convolution and ReLU, by an artificial intelligence accelerated execution file setting module;
   (C) performing an optimization process of a custom layer with an optimization operation function configured to perform a ReLU operation after a Concat operation so as to perform ReLU operations as a single operation in an optimization module, generating the execution model when optimization of the custom layer is completed, and applying a weight value of the execution model received from an execution weight extraction module to the execution model;
   (D) setting a visualized learning model file as the custom layer configured for use in an artificial intelligence execution accelerator by using custom layer setting functions including RPN (region proposal network), NMS (non-maximum suppression), and pooling, by the artificial intelligence accelerated execution file setting module;

(E) converting the custom layer into the execution model configured for use in the artificial intelligence execution accelerator by adding the loaded weight file to the custom layer by the artificial intelligence accelerated execution file setting module; and (F) accelerating execution speed of artificial intelligence by receiving the execution model from an artificial intelligence execution acceleration module and configuring an execution environment corresponding to the execution model, wherein step (D) adjusts a module position of the custom layer by combining the ReLU operations into the single operation and notifying that parallelism is present, calculates the execution model by modifying an operation method of the custom layer by an Even selection operation for selecting only even terms from a matrix and an Odd selection operation for extracting odd terms from the matrix, the Even selection operation is performed by calculating AvgPool 1×1/2 (where, kernel size=1×1, stride size=2×2) according to an average pooling method, the Odd selection operation is performed by calculating AvgPool 1×1/2 after cropping and padding according to a crop method, a padding method, and the average pooling method, step (F) comprises:

calculating an allocated amount of a memory required for each artificial intelligence execution step of the execution model; and optimizing the memory of the artificial intelligence execution acceleration module by reusing a memory area required for each artificial intelligence execution step, and step (F) transforms data processing between a CPU and a GPU, and processes the execution model of artificial intelligence inside the GPU in an async mode so as to minimize an occurrence of overhead.

4. The method of claim 3, wherein step (E) comprises:

extracting a weight file format previously stored in the artificial intelligence learning server by the execution weight extraction module;

converting the extracted weight file format into the learning model; and applying the converted weight file format to the execution model.

* * * * *